United States Patent [15] 3,658,551
Bundus et al. [45] Apr. 25, 1972

[54] MINK FEED

[72] Inventors: Robert H. Bundus, Riverside; Robert J. Bingham, Arlington Heights, both of Ill.

[73] Assignee: Beatrice Foods Co., Chicago, Ill.

[22] Filed: Nov. 27, 1968

[21] Appl. No.: 779,634

[52] U.S. Cl. ...................................99/2 R, 99/7, 99/157, 99/208
[51] Int. Cl. .........................................A23k 1/10, A23k 3/00
[58] Field of Search......................99/2, 7, 208, 18, 209, 107, 99/157, 158

[56] References Cited

UNITED STATES PATENTS

| | | | |
|---|---|---|---|
| 2,086,072 | 7/1937 | Fauth et al. | 99/208 |
| 2,539,544 | 1/1951 | Levin et al. | 99/208 |
| 2,860,993 | 11/1958 | Maher | 99/107 |
| 2,875,061 | 2/1959 | Vogel et al. | 99/7 |
| 3,115,409 | 12/1961 | Hallinan et al. | 99/2 |
| 1,240,020 | 9/1917 | Boberg et al. | 99/209 |
| 2,708,636 | 5/1955 | Rivoche | 99/107 |
| 3,476,569 | 11/1969 | McCarthy | 99/158 |

*Primary Examiner*—Norman Yudkoff
*Assistant Examiner*—Curtis P. Ribando
*Attorney*—Cushman & Cushman

[57] ABSTRACT

A feed for carnivorous animals is provided by cooking a meat product to pasteurize the same, cooling under vacuum while reducing the water to 10–30 percent and then adding an acid as a preservative to give a pH 3.5 to 4.5 and packaging to give a stable product. The preferred meats are fish and chicken or chicken parts and the product is particularly adapted for feeding mink.

9 Claims, No Drawings

MINK FEED

The present invention relates to a feed for carnivorous animals such as minks, cats and dogs.

It has been proposed to make a proteinaceous meaty food for carnivorous animals by adjusting the meaty material to a pH of 2 to 5, heating the food to at least 140° F. to alter the proteinaceous material by reacting with the acid at a pH not over 4.7, stuffing the heated food in a container, sealing the container and then cooling, Hallinan et al. U.S. Pat. No. 3,115,409. This process has the disadvantage that the protein is degraded by the hot acid treatment.

A meat protein containing feed having a substantial moisture content, e.g., 1–30 percent, normally is not stable.

It is an object of the present invention to prepare a meat protein containing feed which is stable for long periods of time even when large amounts of water are present in the feed.

Another object is to develop a nutritious meaty animal feed which is stable and in which t he protein has not been broken down.

Still further objects and the entire scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing as a feed for carnivorous animals a meat product containing 10 to 30 percent, preFerably 25 percent, of free water. The product also has a pH of 3.5 to 4.5, preferably 4.0.

The product is prepared by cooking the meat product at the natural pH, usually about 6 or slightly above to pasteurize the same. Pasteurization temperatures are conveniently 170° to 212° F., preferably 180° F., for 10 to 60 minutes, preferably 40 minutes. The pasteurization should be long enough to destroy pathogenic organisms and greatly reduce the overall bacterial population. The excess moisture is now eliminated by vacuum cooling at the boiling point of water. The vacuum can be from 15 inches to 29.5 inches of mercury or higher, preferably the vacuum is at least 26 inches, most preferably 29.5 inches. The higher the vacuum the lower the temperature and the less the decomposition. Vacuums above 29.5 inches can be used, but the cost of the process is increased. When the moisture content is right the vacuum is stopped and acid added at room temperature, e.g., 60° to 100° F. to adjust the pH to 3.5 to 4.5 and the product is then packaged in any suitable containers such as cans, glass jars, saran bags, saran coated polyethylene bags, polyvinyl chloride bottles, etc. The product has an excellent shelf life, e.g., 1 year or more.

The meat product can consist of fish or fish byproduct (e.g., heads, offal, etc.). Any kind of fish can be used, e.g., sea robins, salmon, catfish, herring, sharks, etc. Land animal meat can also be used, e.g., chicken, chicken byproducts, e.g., heads and entrails, horsemeat, blood, liver, kidney, heart, spleen, tongue, beef, veal, pork, lungs, skin. For feeding mink preferably the product is predominately or entirely fish and chicken, but in the case of dogs and cats and zoo animals, a wider variety of meaty products can be employed.

There can be added 1 to 40 percent of a farinaceous material, e.g., corn meal, wheat, rye, oats, rice. Thus a combination of 80 percent fish and chicken and 20 percent corn meal can be used, for example. Vitamins and mineral supplements can be added as in conventional animal feeds.

As the acid used as a preservative, there can be employed organic acids such as malic acid, citric acid, maleic acid, fumaric acid, lactic acid, acetic acid, glycolic acid, gluconic acid and tartaric acid. Inorganic acids can also be used such as phosphoric acid. Strong acids such as sulfuric acid and hydrochloric acid are not preferred because they have too strong an action on teeth. However, they can be used in small amounts together with weaker acids to lower the pH.

Unless otherwise indicated all proportions and percentages are by weight.

EXAMPLE 1

Ground fish was placed in a vacuum cooker and pasteurized at 180° F. for 40 minutes at the natural pH of 6.3 for the fish. Vacuum was then applied to 29.5 inches to cool the fish and remove eater until the free water content was 25 percent. Then the vacuum was released and the product cooled to room temperature (70° F.). Citric acid was added to give a pH of 4.0. The product was then packaged in a saran container. The packaged product had a shelf live of over 1 year.

This product was particularly suitable as a feed for minks, as well as zoo animals such as seals, walruses, seal lions, and otters, but was also suitable for feeding other zoo animals as well as dogs and cats.

The product can be vacuum packed if desired.

EXAMPLE 2

Ground whole chicken was placed in a vacuum cooker and pasteurized at 190° for 30 minutes. Then the natural pH was 6.4 for the whole chicken. Vacuum then applied at 29.5 inches to cool the whole chicken and remove water until the free water content was 30 percent. Then the vacuum was released and the product cooled to room temperature. Malic acid was added to give a pH of 4.5. The product was then packaged in a polyethylene container.

The combination of 40 percent fish from Example 1, and 60 percent whole chicken from Example 2, were mixed in a double-ribbon mixer and packaged as a combination product.

EXAMPLE 3

Ground chicken heads and entrails were placed in a vacuum cooker and pasteurized at 180° for 40 minutes. The natural pH was 6.1 for the heads and entrails. Vacuum was then applied to 29.0 inches to cool the heads and entrails and remove water until the free water content was 25 percent. Then the vacuum was released and the product cooled to room temperature. Lactic acid was added to give a pH of 4.0. The product was then packaged in polyethylene/saran container.

A mixture of the ground fish from Example 1, the ground whole chicken from Example 2, and the heads and entrails from Example 3 were blended in a double-ribbon mixer to a ratio of 30–30–40. Then this product was packaged as a combination product.

It is claimed:

1. A process of preparing an animal food containing proteinaceous meaty material consisting essentially of heating the food at its natural pH to pasteurize the food, applying vacuum of at least 15 inches to the pasteurized food to cool the food to the boiling point of water at the applied vacuum, reducing the water content of the food to 10 to 30 percent while under said vacuum, releasing the vacuum, cooling to atmospheric temperature, reducing the pH of the food to 3.5 to 4.5 and packaging the food.

2. A process according to claim 1 wherein the vacuum is 26 to 29.5 inches.

3. A process according to claim 2 wherein the water content is reduced to 25 percent, the pH is reduced to 4.0 and the acid employed is an organic acid.

4. A process according to claim 1 wherein the meaty material is predominantly fish.

5. A process according to claim 4 wherein the vacuum is 26 to 29.5 inches.

6. A process according to claim 5 wherein the water content is reduced to 25 percent.

7. A process according to claim 6 wherein the pH is reduced to 4.0 and the acid employed is an organic acid.

8. A process according to claim 1 wherein the meaty material is predominantly whole chicken.

9. A process according to claim 1 wherein the meaty material is predominantly chicken head and entrails.

* * * * *